Patented Mar. 12, 1946

2,396,415

UNITED STATES PATENT OFFICE 2,396,415

PIGMENTED FILM-FORMING COMPOSITIONS

Earl K. Fischer, Long Island City, N. Y., assignor to Interchemical Corporation, New York, N. Y., a corporation of Ohio No Drawing. Application August 6, 1942, Serial No. 453,849

2 Claims. (Cl. 106—241)

This invention relates to pigmented liquid coating compositions, and aims to provide a means for keeping pigment deflocculated in oily, resinous, and oleoresinous compositions by the use of the plant glucoside, saponin.

When pigments are dispersed in liquid, resinous, oleoresinous or oily vehicles, the compositions exhibit flow properties which can be measured by means of a rotational viscometer, and which are described by two measurable factors, the plastic-viscosity (expressed as poises) and the yield value (expressed as dynes per sq. cm.). The yield value is a measure of the extent of flocculation: the lower the yield value the greater the fluidity of the composition at a given plastic-viscosity. Since it is often desired to have a maximum quantity of pigment dispersed in a vehicle at a given fluidity, particularly in printing inks, it is often highly desirable to reduce flocculation to a minimum. The effort in this direction has been principally concerned with changes in the interfacial energies at the interface between the solid and the liquid, by the use of special dispersion techniques, and by the use of the surface active agents.

I have discovered that the plant glucoside, saponin, is an unusually effective deflocculant in resinous, oleoresinous and oily liquid film-forming vehicles, being far superior in this regard for most compositions than previously known deflocculants, and generally as effective for all types of these compositions.

Theoretically, sufficient saponin must be added to provide a monomolecular film of the material on the particular film employed. In practice this will vary from about 0.1 to 5% of the pigment weight, depending on the specific surface of the pigment. The high percentage is used with pigments of high specific surface such as carbon blacks.

Typical examples of my invention are the following:

Example 1

35 parts by weight carbon black were mixed with 65 parts by weight mineral oil (5 poise viscosity at 25° C.) in a dough mixer, and heavily malaxated for one hour.

The resultant paste was thinned with an equal quantity of mineral oil to yield an ink having a viscosity of 16.5 poises, and a yield value of 2900 dynes per sq. cm.

An identical ink was prepared, except that a portion of the mineral oil was replaced by 5% of the pigment weight of saponin in 63.2 parts of mineral oil. The resultant ink had a viscosity of 14 poises, and a yield value of 1440 dynes per sq. cm., indicating that the saponin had reduced the body to half of the original value.

Example 2

30.6 parts by weight iron blue were ground in 69.4 parts by weight bodied linseed oil (viscosity 7 poises at 25° C.).

The resultant ink had a viscosity of 185 poises, and a yield value of 103 dynes per sq. cm.

When a portion of the linseed varnish was replaced by 5% of saponin, based on pigment weight (3 parts by weight of saponin), the resultant ink had a viscosity of 142 poises, and a 0 yield value.

It is convenient in many cases to prepare a stock concentrate of saponin by grinding one part of saponin in two parts of the vehicle; litho varnish (No. 1 body) is a suitable carrier for the reagent. This paste can be added to the dispersion at the time the pigment dispersion is ground.

Similar results are obtained with other pigments—e. g. ultramarine blue, toluidine toner, phthalocyanine blue, etc., in a variety of vehicles, including oleoresinous varnishes, alkyd and other resin solutions, and the like.

Examples can of course be multiplied indefinitely without departing from the scope of my invention, which is defined in the claims.

I claim:

1. A liquid pigmented composition comprising a liquid organic film forming vehicle containing film forming ingredients of the group consisting of oils and resins, a pigment and saponin, the saponin at the vehicle-pigment interface being present to the extent of about 0.1 to 5% of the weight of the pigment, the composition being characterized by a substantially lower degree of flocculation than a similar composition without the saponin.

2. A liquid pigmented composition comprising a liquid organic film forming vehicle containing film forming ingredients of the group consisting of oils and resins, carbon black and saponin, the saponin at the vehicle pigment interface being present to the extent of about 5% of the weight of the carbon black, the composition being characterized by a substantially lower degree of flocculation than a similar composition without the saponin.

EARL K. FISCHER.